United States Patent [19]

Pfenninger

[11] 4,094,747
[45] June 13, 1978

[54] THERMAL POWER STATION COMBINED WITH A PLANT FOR SEAWATER DESALINATION

[75] Inventor: Hans Pfenninger, Baden, Switzerland

[73] Assignee: BBC Brown, Boveri & Company Limited, Baden, Switzerland

[21] Appl. No.: 786,870

[22] Filed: Apr. 12, 1977

[30] Foreign Application Priority Data

May 14, 1976 Switzerland .................... 6052/76

[51] Int. Cl.² ............................................. B01D 3/02
[52] U.S. Cl. ........................... 202/173; 159/DIG. 39; 60/648; 203/DIG. 20
[58] Field of Search .............. 159/DIG. 39; 202/173, 202/233, 174; 203/DIG. 20; 60/648

[56] References Cited

U.S. PATENT DOCUMENTS

| | | | |
|---|---|---|---|
| 3,416,318 | 12/1968 | Chocquet | 60/648 |
| 3,438,202 | 4/1969 | Roe | 60/648 |
| 3,489,652 | 1/1970 | Williamson | 202/173 |
| 3,681,920 | 8/1972 | Margen | 203/DIG. 20 |

OTHER PUBLICATIONS

Fresh Water Through Desalination Franquelin–Side M. Brown Boveri Rev. v54 (1967), pp. 9–16.

*Primary Examiner*—Hiram H. Bernstein
*Attorney, Agent, or Firm*—Burns, Doane, Swecker & Mathis

[57] ABSTRACT

A combined thermal power station and a desalination plant for seawater in which the power station includes a gas turbine set, a waste heat boiler connected to the exhaust gas outlet of the gas turbine and a steam turbine. The waste heat boiler includes first and second sections arranged in cascade on the water side in the flow path of the turbine exhaust gases, the first section in the exhaust gas flow path constituting a steam generator for the steam turbine and the second section constituting a source of heat utilized in the desalination plant. Seawater may be passed directly through the second section of the waste heat boiler or high-temperature hot water produced by the second section may be passed through a heat exchanger incorporated in the flow path of the seawater. The waste heat boiler may further include an additional source of heat in the form of a fuel burner for maintaining operation of the steam turbine and desalination plant under emergency conditions in the event the gas turbine set is stopped.

5 Claims, 2 Drawing Figures

THERMAL POWER STATION COMBINED WITH A PLANT FOR SEAWATER DESALINATION

BACKGROUND OF THE INVENTION

The invention concerns a thermal power station with a gas turbine having connected after it a heat exchanger in which part of the heat still contained in the exhaust gases of the gas turbine is used to heat a plant for seawater desalination.

Steam turbines are usually employed to operate plants for desalinating seawater, the exhaust steam from the turbines serving as a heat source for the distillation process in that the condenser heats the seawater used as a coolant. (Publication of the Societe Internationale de Dessalement (SIDEM), Paris: Production d'eau douce par dessalement.)

The most economical temperatures for the distillation process lie between about 150° and 180° C, which corresponds to a back-pressure at the steam turbine of some 5 to 6 bar. In the case of very expensive fuels, relatively high plant costs are still economical, and one can resort to a back-pressure of some 2 to 3 bar; this corresponds to a steam temperature of about 120° to 130° C.

It is often more efficient to use a gas turbine instead of a steam turbine as the heat source for the desalination plant, the exhaust gases of the gas turbine being utilized in a heat exchanger to heat high-temperature hot water for the seawater desalination process (Brown Boveri Rev. vol. 54 (1967) p. 9–16). Unfortunately, the temperature of the exhaust gases is very high; in present-day gas turbines it is normally 450°–550° C. Lowering this temperature by raising the pressure ratio through the gas turbine would seriously impair the thermal process because output and efficiency of a gas turbine fall sharply when the optimum pressure ratio is exceeded.

The exhaust gas temperature is therefore too high for the desalination plant because it results in unacceptably high steam temperatures in the distillation, and hence leads necessarily to unacceptably high steam pressures. The high steam pressures, however, would make the multistage cascade evaporation process very expensive, or indeed impracticable. Furthermore, the high temperatures would cause fouling of the tubes due to the salt contained in the seawater. But if the temperature of the high-temperature hot water for the distillation process is reduced to about 120°–170° C, the valuable heat at the outlet from the gas turbine is severely degraded owing to increased entropy.

The seawater desalination plants in use today are therefore unsatisfactory from the economic standpoint.

SUMMARY OF THE INVENTION

The object of the invention is to utilize economically the exhaust heat of a gas turbine while retaining the good efficiency of the gas turbine, to which is connected a heat exchanger for supplying heat to a seawater desalination plant.

This object is achieved in that the heat exchanger is in the form of a waste heat boiler with, on the water side, two separate sections of which that section utilizing the high exhaust gas temperatures is used to generate steam for a steam turbine, and the second section constitutes directly or indirectly the heat source for the seawater desalination plant.

An improvement in overall thermal efficiency is obtained by combining the gas turbine with a steam turbine. The exhaust gas outlet temperatures from the section of the boiler used to generate steam for the steam turbine are about 180°–200° C, which allows an optimum configuration for the entire steam section. The temperature difference between the two flow media in the steam-generating section of the boiler can then be chosen more favourably, thus making this part of the boiler much cheaper. Heating of the feedwater by bled steam can be raised to 150°–170° C, the result of this being that the steam process is improved, the condenser is smaller and the wetness of the steam in the steam turbine is reduced. The lower exhaust gas temperatures after the first boiler section are also very well suited to the second boiler section, which is used to generate high-temperature hot water for the desalination plant or to heat the seawater directly. The overall arrangement permits almost optimum utilization of the fuel. Economically, the combined plant with seawater desalination is superior to a desalination plant with either gas turbines only, or steam turbines only.

BRIEF DESCRIPTION OF DRAWINGS

Two examples of the invention are shown in the drawings and will be described below in more detail. In the drawings.

In both figures, identical components have the same reference symbols.

DETAILED DESCRIPTION OF PREFERRED EMBODIMENTS

Figure 1:
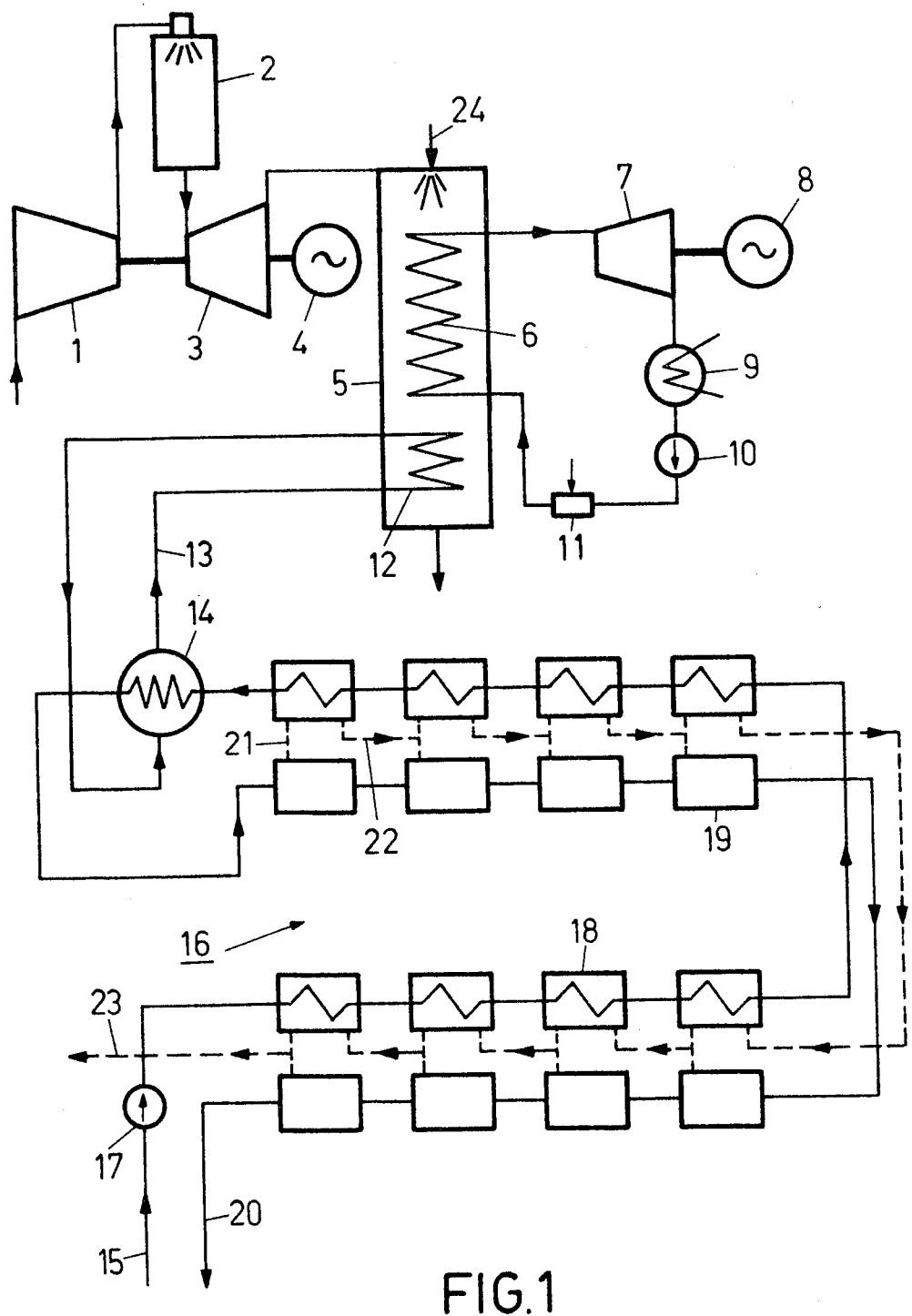
FIG. 1 shows a power station with generation of high-temperature hot water for supplying heat to the seawater desalination plant.

In FIG. 1, the gas turbine set comprises the axial compressor 1, the combustor 2, the gas turbine 3 and the generator 4. The after-connected waste heat boiler 5 consists on the water side of two sections 6 and 12 connected in cascade relative to the flow path of the hot exhaust gas through the boiler. The first section 6 in the exhaust gas flow path is the steam generator which provides high pressure steam for the steam turbine set which, insofar as its principal components are shown, comprises the steam turbine 7, the generator 8, the condenser 9, the feedwater pump 10 and the feedwater heater 11.

The following less hot section 12 in the exhaust gas flow path through the boiler serves to produce high-temperature hot water which passes through a closed water loop 13 and, in heat exchanger 14, surrenders part of its heat to the seawater to be heated.

The seawater flows at 15 into the desalination plant 16, which is arranged for cascade evaporation. The pump 17 propels the seawater through a number of condensers 18 connected in series, in which it passes through pipes. The seawater then flows through the heat exchanger 14, in which it is heated to the required operating temperature, and then through the evaporators 19, which are also connected in series and of which there are the same number as there are condensers. The brine remaining at the end is drawn off at 20.

The way in which such an installation functions is known. The seawater, heated in heat exchanger 14 and under pressure, is able to expand a little from one evaporator 19 to the next, whereupon pure water evaporates from the free water surface. This water vapour rises through the connecting pipe 21 into the condenser 18 pertaining to this stage. There is a partial vacuum in the condenser and the vapour condenses on the cold pipes carrying the seawater. At the same time, the seawater in the pipes is heated slightly by the condensation process, and therefore a smaller quantity of heat has to be supplied in the heat exchanger 14.

The condensate flows in the direction of the arrow through the pipe 22 to the next stage, passes with the water vapour of this evaporator into the associated condenser, flows out again, and so on. The condensate obtained in this way, increasing in quantity from stage to stage, can be used as potable water and is drawn off at 23.

The boiler 5 can be a pure waste heat boiler which makes use solely of the heat still contained in the exhaust gases from the gas turbine, but it can also be provided with an additional burner 24. This has the advantage that the steam turbine set can be designed for a greater output if the additional burner is continuously in operation. A further possibility is that the additional burner is intended only for emergencies in order to maintain emergency operation of the steam turbines and the desalination plant if the gas turbine set is stopped, owing to a breakdown, for example.

Figure 2:
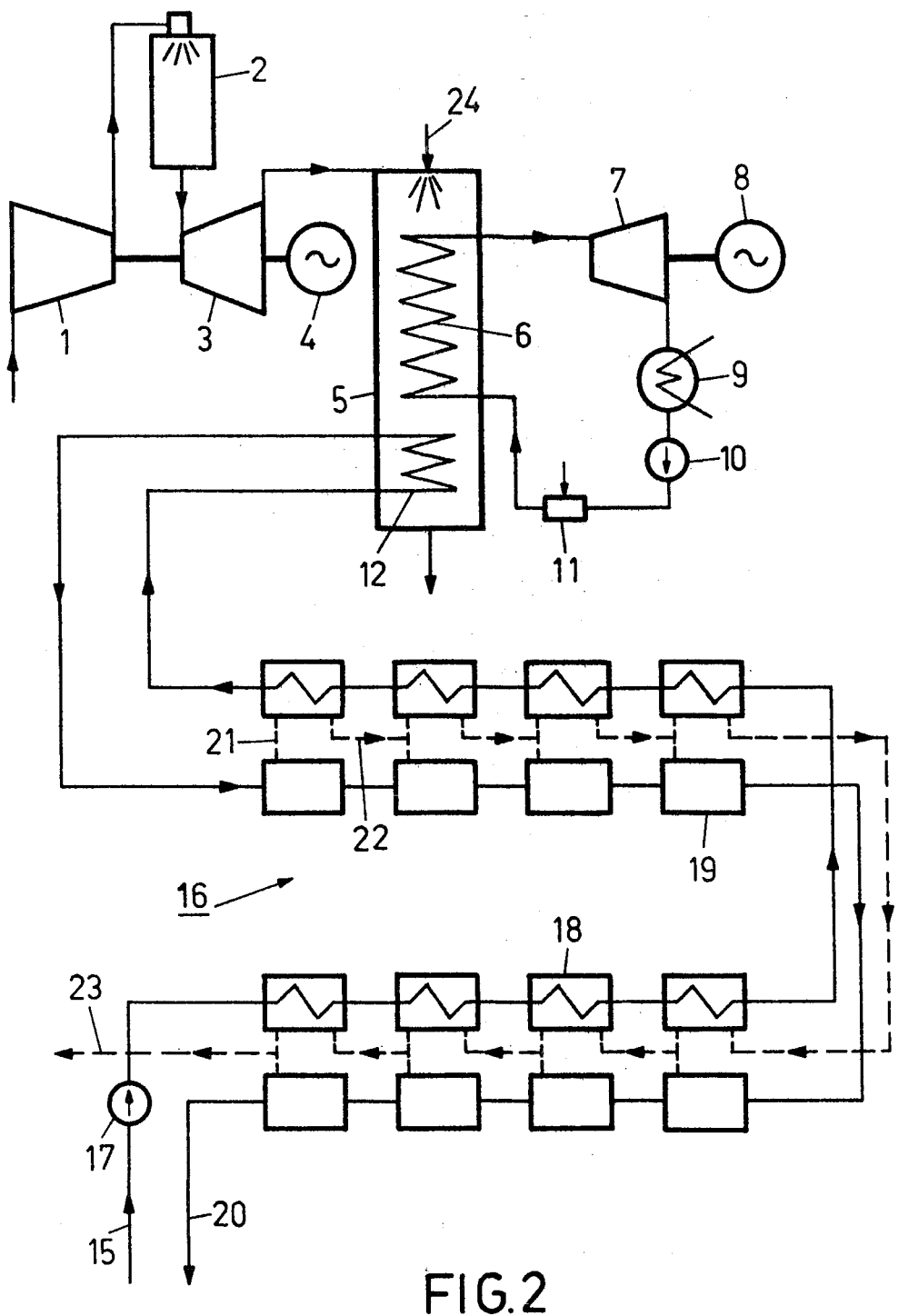
FIG. 2 shows a power station similar to that in FIG. 1, except that the seawater is heated directly.

FIG. 2 shows a power station similar to that in FIG. 1, except that the seawater is heated not in a separate heat exchanger via an intermediate water loop, but directly in the waste heat boiler 5, in that the second section 12 of the boiler is included in the flow path of the seawater. This arrangement is particularly advantageous if the temperature of the exhaust gases after the second boiler section is already relatively low, and fouling of the tubes is no longer to be feared.

I claim:

1. A combined thermal power station and a desalination plant for seawater wherein said thermal power station comprises a gas turbine set which includes a compressor and gas turbine with a combustor therebetween, a steam turbine, and a waste heat boiler connected to and which receives hot exhaust gas from said gas turbine, said waste heat boiler comprising on the water side first and second sections connected in cascade relative to the flow path of the hot exhaust gas through said boiler, the first section in the exhaust gas flow path constituting a steam generator for said steam turbine and the second section constituting a source of heat utilized in the desalination plant.

2. A combined thermal power station and desalination plant as defined in claim 1 wherein said second section of said waste heat boiler provides high-temperature hot water for heating the desalination plant.

3. A combined thermal power station and desalination plant as defined in claim 2 wherein the high-temperature hot water produced by said second section of said waste heat boiler is passed through a heat exchanger incorporated in the flow path of the seawater through the desalination plant.

4. A combined thermal power station and desalination plant as defined in claim 2 wherein the seawater of the desalination plant is flowed directly through said second section of said waste heat boiler.

5. A combined thermal power station and desalination plant as defined in claim 1 and which further includes a fuel burner in said waste heat boiler for maintaining operation of said steam turbine and desalination plant under emergency conditions in the event said gas turbine set is stopped.

* * * * *